United States Patent
Bolms et al.

(10) Patent No.: US 10,180,081 B2
(45) Date of Patent: Jan. 15, 2019

(54) PROCESS FOR COOLING THE TURBINE STAGE AND GAS TURBINE HAVING A COOLED TURBINE STAGE

(75) Inventors: Hans-Thomas Bolms, Mülheim an der Ruhr (DE); Boris Dobrzynski, Düsseldorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 869 days.

(21) Appl. No.: 14/009,905

(22) PCT Filed: Mar. 8, 2012

(86) PCT No.: PCT/EP2012/053971
§ 371 (c)(1),
(2), (4) Date: Dec. 9, 2013

(87) PCT Pub. No.: WO2012/136437
PCT Pub. Date: Oct. 11, 2012

(65) Prior Publication Data
US 2014/0133956 A1     May 15, 2014

(30) Foreign Application Priority Data
Apr. 7, 2011 (EP) .................................. 11161499

(51) Int. Cl.
*F01D 25/12* (2006.01)
*F01D 5/18* (2006.01)
*F02C 7/18* (2006.01)

(52) U.S. Cl.
CPC ............. *F01D 25/12* (2013.01); *F01D 5/186* (2013.01); *F01D 5/187* (2013.01); *F02C 7/18* (2013.01); *F05D 2260/202* (2013.01)

(58) Field of Classification Search
CPC .......... F01D 25/12; F01D 5/187; F01D 5/186; F01D 9/065; F01D 9/06; F05D 2260/065; F02C 7/18
See application file for complete search history.

(56) References Cited

U.S. PATENT DOCUMENTS 3,385,509 A     5/1968 Michel
3,726,604 A *  4/1973 Helms ..................... F01D 5/184
                                                          415/115

(Continued)

FOREIGN PATENT DOCUMENTS

DE          19604416 A1   8/1997
DE       102007051857 B3   4/2009
(Continued)

*Primary Examiner* — Justin Seabe
*Assistant Examiner* — Brian P Wolcott

(57) ABSTRACT

A gas turbine having a turbine stage is presented. The gas turbine has a guide vane that can be operated cooled by a cooling medium, and a cooling medium feed device for feeding the cooling medium into the interior of the guide van, which, in the region of its rear edge, has on the pressure side at least one cooling medium outlet opening, through which the cooling medium can flow out of the interior of the guide vane into the main flow. The cooling medium feed device has a mass flow control device for controlling the mass flow through the at least one cooling medium outlet opening, with which the mass flow through the at least one cooling medium outlet opening can be increased during operation of the gas turbine under part-load compared to operation of the gas turbine under full load.

10 Claims, 1 Drawing Sheet

(56) References Cited

U.S. PATENT DOCUMENTS

| | | | |
|---|---|---|---|
| 4,767,259 A | 8/1988 | Kumata | |
| 8,015,826 B2 * | 9/2011 | Myers | F01K 13/02 60/782 |
| 2004/0040309 A1 | 3/2004 | Ziegner | |
| 2010/0154434 A1 | 6/2010 | Fujii | |
| 2010/0175387 A1 | 7/2010 | Chhabra | |

FOREIGN PATENT DOCUMENTS

| | | |
|---|---|---|
| EP | 1000224 | 5/2000 |
| EP | 0879347 B1 | 10/2002 |
| EP | 1084327 | 11/2003 |
| EP | 1921292 A2 | 5/2008 |
| GB | 938247 A | 10/1963 |
| GB | 1338354 A | 11/1973 |
| JP | H0754669 A | 2/1995 |
| JP | 2006022811 A | 1/2006 |
| RU | 2009105074 A | 8/2010 |

\* cited by examiner

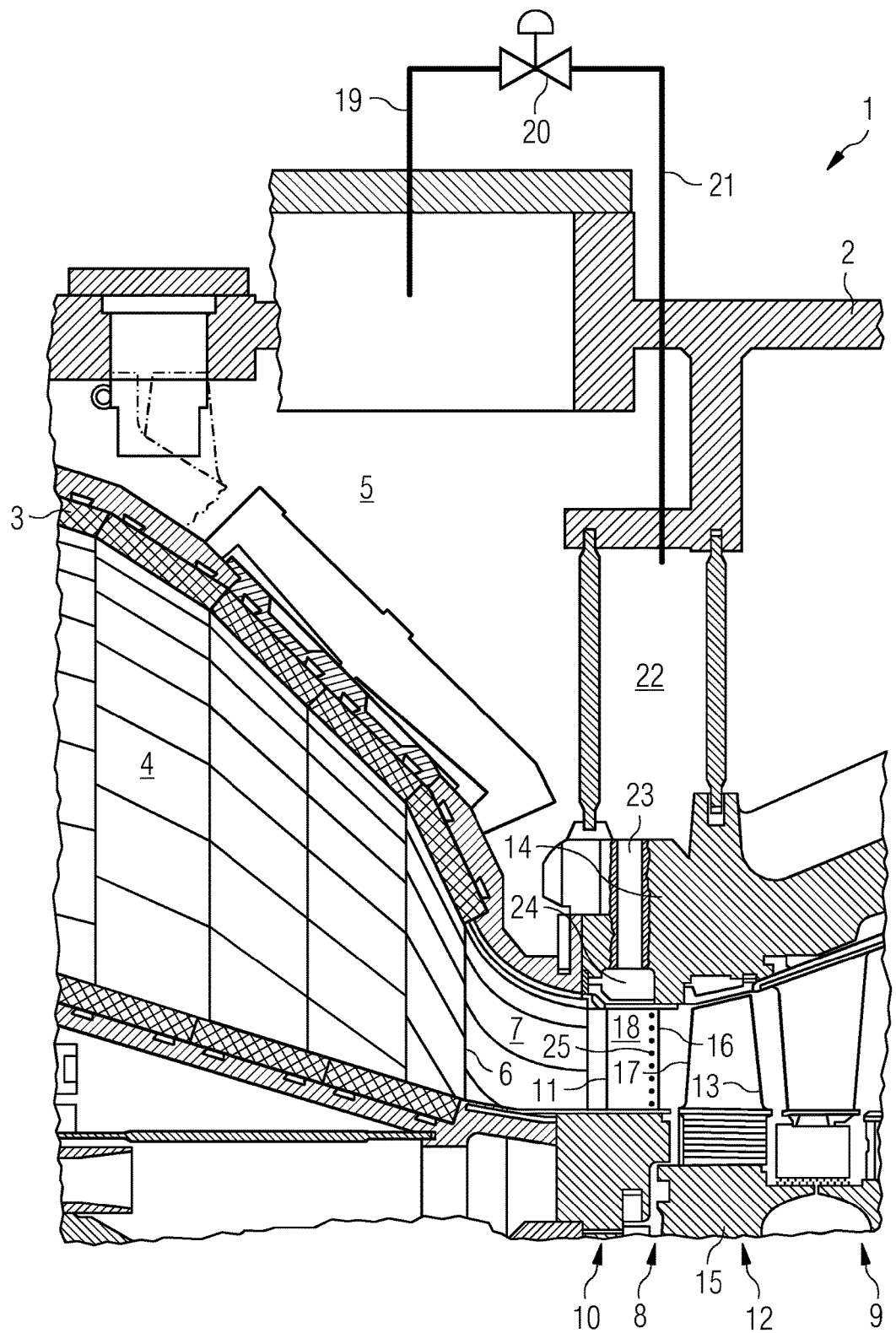

PROCESS FOR COOLING THE TURBINE STAGE AND GAS TURBINE HAVING A COOLED TURBINE STAGE

CROSS REFERENCE TO RELATED APPLICATIONS

This application is the US National Stage of International Application No. PCT/EP2012/053971 filed Mar. 8, 2012 and claims benefit thereof, the entire content of which is hereby incorporated herein by reference. The International Application claims priority to the European application No. 11161499.6 EP filed Apr. 7, 2011, the entire contents of which is hereby incorporated herein by reference.

FIELD OF INVENTION

The invention relates to a gas turbine having a turbine stage which has guide blades operable with cooling by a cooling medium and has a cooling medium supply device for supplying the cooling medium into the interior of the guide blades, and to a method for cooling the turbine stage.

BACKGROUND OF INVENTION

A gas turbine is coupled, for example in a power plant for the generation of electrical energy, to a generator and is thus operated both at part load and also at full load at the same rotational speed. The gas turbine has a compressor, a combustion chamber and a turbine, wherein ambient air is drawn in and compressed by the compressor, said ambient air being heated in the combustion chamber by way of the combustion of a fuel. The heated and compressed air is expanded in the turbine with work being performed, wherein the generator is driven by means of the excess work thereby gained. The turbine is conventionally of axial type of construction, wherein the guide blade rows and rotor blade rows are arranged in an alternating fashion and one behind the other in a main flow direction. To attain the highest possible thermodynamic efficiency of the gas turbine, it is desirable for the gas turbine to be operated with as high a turbine inlet temperature as possible. The maximum admissible turbine inlet temperature is determined by the thermal load capacity of the turbine, in particular of the guide blade rows and of the rotor blade rows of the turbine.

An increase in the maximum admissible turbine inlet temperature is possible if for example the first guide blade row directly downstream of the combustion chamber outlet is cooled. For the cooling of the guide blade row, it is known for example from GB 1 338 354 and GB 938 247 for the guide blades of the guide blade row to be of hollow form and to be traversed by a flow of cooling air which is extracted for example from the compressor.

If the gas turbine is operated at part load, the turbine inlet temperature and the overall pressure ratio of the gas turbine decrease in relation to full-load operation of the gas turbine, whereby the thermodynamic efficiency of the gas turbine is disadvantageously decreased in part-load operation. Furthermore, in part-load operation of the gas turbine, the overall mass flow of the main flow through the gas turbine is reduced, whereby it is disadvantageously the case that the relative approach flow angles to the turbine rotor blades, in particular to the turbine rotor blades of the rotor blade row downstream of the first guide blade row, differ from the approach flow angles in the design state. This leads to an incorrect impingement of flow on the turbine rotor blades in part-load operation of the gas turbine, whereby the exertion of work on the turbine rotor blades is disadvantageously reduced. Furthermore, in part-load operation of the gas turbine, the fuel supply into the combustion chamber is reduced, whereby the flame temperature in the gas turbine decreases. This can result in disadvantageous combustion instabilities in the combustion chamber, which adversely affect the operation and the availability of the gas turbine in part-load operation.

If the gas turbine is switched entirely from full-load operation to part-load operation, the individual stage pressure ratios and thus the overall pressure ratio of the gas turbine decrease, and the exhaust-gas temperature increases in the case of a turbine inlet temperature remaining substantially the same. This can give rise to an operating state in which the exhaust-gas temperature exceeds a maximum admissible maximum value. An adequate reaction to this would, in said part-load operation, be to reduce the turbine inlet temperature in order that the exhaust-gas temperature is returned to a value less than or equal to its maximum admissible maximum value, this however disadvantageously being associated with a decrease in the thermodynamic efficiency of the gas turbine.

The secondary air consumption is determined, as per GB 1 338 354, by the cooling air consumption which is required at rated load. As a result of the temperature decrease at part load, it is then possible for a part of the cooling air to be saved. The saved fraction is then discharged as "jet flap air" at the trailing edge of the guide blades for the purpose of diversion manipulation. A change in the secondary air consumption as a function of the operating state is not provided in GB 1 338 354. According to GB 938 247, however, a deactivation of the cooling of the turbine guide blades may be provided.

SUMMARY OF INVENTION

It is an object of the invention to provide a gas turbine and a method for cooling a turbine stage of the gas turbine, wherein the gas turbine can be operated at part load in a stable manner and with high thermodynamic efficiency.

The gas turbine according to the invention having a turbine stage has a guide blade operable with cooling by a cooling medium and has a cooling medium supply device for supplying the cooling medium into the interior of the guide blade, which guide blade has, in the region of its trailing edge and on its pressure side, at least one cooling medium outlet opening through which the cooling medium can be caused to flow out of the interior of the guide blade into the main flow, wherein the cooling medium supply device has a mass flow control device for controlling the mass flow through the at least one cooling medium outlet opening, by means of which mass flow control device the mass flow through the at least one cooling medium outlet opening can be increased in part-load operation of the gas turbine in relation to full-load operation of the gas turbine. The method according to the invention for cooling the turbine stage of the gas turbine has the steps: operating the gas turbine at part load; controlling the mass flow control device such that the mass flow through the at least one cooling medium outlet opening is increased in relation to the mass flow through the at least one cooling medium outlet opening in full-load operation of the gas turbine.

The guide blade that is operable with cooling by the cooling medium is designed such that, in full-load operation, with a supply of a correspondingly adequately large mass flow of the cooling medium, it can be operated at the design point with an adequately long service life. In the design of the guide blade, it is taken into consideration that the mass flow of the cooling medium is large enough that thermal overloading of the guide blade is prevented owing to the cooling action by the cooling medium on the guide blade. The profiling of the guide blade is selected such that, taking into consideration the cooling action by the cooling medium and the aerodynamic influence thereof, the guide blade meets defined design requirements at the design point.

As a result of the pressure-side outflow of the cooling medium through the at least one cooling medium outlet opening in the region of the trailing edge of the guide blade, the diversion action of the guide blade is intensified in relation to the diversion action of the guide blade with little or no outflow of the cooling medium through the at least one cooling medium outlet opening in the region of the trailing edge of the guide blade. Thus, if the mass flow of the cooling medium flowing out of the at least one cooling medium outlet opening at the pressure side is increased by means of the mass flow control device during operation of the gas turbine, the diversion action of the guide blade is consequently intensified.

The increase of the mass flow of the cooling medium would not be required with regard to the required cooling action by the cooling medium. The increase of the mass flow of the cooling medium yields an intensification of the diversion action of the guide blade. Thus, during operation of the guide blade with increased mass flow of the cooling medium that flows off the guide blade on the pressure side in the region of its trailing edge, the diversion angle of the guide blade can be adjusted through corresponding selection of the mass flow of the cooling medium, even though the guide blade is operated with sufficient cooling by the cooling medium.

This is advantageous in particular in part-load operation of the gas turbine, in which the diversion action of the guide blade is disadvantageously reduced. Said reduction can advantageously be counteracted by virtue of the mass flow control device for controlling the mass flow through the at least one cooling medium outlet opening being used to increase the mass flow through the at least one cooling medium outlet opening in part-load operation of the gas turbine in relation to full-load operation of the gas turbine. In this way, in part-load operation of the gas turbine, the diversion action of the guide blade can be advantageously increased, wherein the guide blade is nevertheless cooled to an adequate extent. Furthermore, through corresponding actuation of the mass flow control device, the mass flow of the cooling medium through the at least one cooling medium outlet opening can be adjusted such that the stage pressure ratio across the guide blade and the rotor blade is increased. The increase in the stage pressure ratio permits an increase in the turbine inlet temperature while maintaining the same exhaust-gas temperature, resulting in an increase in the thermodynamic efficiency and the specific power of the gas turbine.

It is preferable for the mass flow control device to have a throttle valve for mass flow control and for the guide blade to be designed, in full-load operation, for a mass flow of the cooling medium which is throttled by the throttle valve. It is furthermore preferable for the guide blade to be designed, in part-load operation, for a mass flow of the cooling medium which is not throttled by the throttle valve. The cooling medium is preferably compressor exit air, and the mass flow control device is preferably fed with the compressor exit air from the compressor exit.

It is preferably provided that, in part-load operation of the gas turbine, the compressor exit air is conducted so as to bypass the combustion chamber. The compressor exit air is conducted so as to bypass the gas turbine of the combustion chamber in part-load operation for example in order that, during the decrease in turbine inlet temperature, an excessively intense drop in flame temperature is prevented and combustion instabilities are avoided. The compressor exit air conducted so as to bypass the combustion chamber in part-load operation is surplus and is thus preferably available to the cooling medium supply device for the cooling of the guide blade.

In part-load operation, the mass flow control device is preferably operated without throttling, wherein the compressor exit air conducted so as to bypass the combustion chamber is used for the cooling of the guide blade. By contrast, if the gas turbine is operated at full load, the throttle valve of the mass flow control device is placed into a throttling position, whereby the mass flow of the cooling medium is reduced. Said reduction in the mass flow of the cooling medium should preferably be selected such that both adequate cooling and also an adequate diversion action of the guide blade are provided at all times during the operation of the gas turbine.

The guide blade preferably has a cooling medium inlet, through which the cooling medium can be caused to flow into the interior of the guide blade, and a cooling medium reservoir, by means of which the cooling medium is provided to the cooling medium inlet by the mass flow control device. The cooling medium reservoir is advantageously provided as a buffer vessel for the cooling medium, such that it is possible in particular for a large transient demand for cooling medium by the guide blade to be compensated by the cooling medium reservoir. Furthermore, the flow speeds in the cooling medium reservoir are low, such that flow losses in the cooling medium reservoir are low.

The mass flow control device is preferably fed from a compressor plenum of the gas turbine. It is in particular the case that that fraction of the compressor exit air which is conducted so as to bypass the combustion chamber in part-load operation of the gas turbine is conducted into the compressor plenum. Furthermore, the compressor exit pressure prevails in the compressor plenum, such that, in the compressor plenum, the cooling medium is provided with an adequately high pressure for corresponding throttling preferably by means of the throttle valve.

The cooled guide blade is preferably the first guide blade, arranged immediately downstream of the combustion chamber of the gas turbine, of the first turbine stage of the gas turbine. Furthermore, in the method according to the invention, it is preferable for the mass flow to be set such that the part-load operation of the gas turbine is optimized with regard to the thermodynamic efficiency and/or with regard to the flow impingement angle on the rotor blade arranged downstream of the guide blade and/or with regard to the exhaust-gas temperature of the turbine of the gas turbine and/or with regard to the flame stability in the combustion chamber of the gas turbine.

In a known way, with decreasing gas turbine load, the absolute value of the compressor mass flow and the absolute values of the secondary mass flows also decrease. To then nevertheless effect a higher consumption of cooling air in part-load operation, provision is made such that, with a decrease in the gas turbine load, the percentage value of the cooling medium mass flow—in relation to the compressor intake mass flow—is increased. This increases the relative consumption of cooling medium in part-load operation in relation to full-load operation.

BRIEF DESCRIPTION OF DRAWINGS

The invention will be explained in more detail below on the basis of the appended schematic drawing. The FIGURE shows a longitudinal section through an embodiment of the gas turbine according to the invention in the region of the combustion chamber and of the turbine.

DETAILED DESCRIPTION OF INVENTION

As can be seen from the FIGURE, a gas turbine 1 has a housing 2 in which there are arranged a compressor (not shown), a combustion chamber 3 and a turbine which has multiple turbine stages 8, 9. Downstream of the compressor exit there is arranged a diverting diffuser (not shown) which issues into a compressor plenum 5 which is formed as a cavity in the housing 3 and in which the combustion chamber 3 is arranged. During the operation of the gas turbine 1, ambient air is drawn in, and compressed to a compressor exit pressure, by the compressor. From the compressor exit, the compressor exit air enters the combustion chamber interior 4 of the combustion chamber 3 and is mixed with a liquid or gaseous fuel. Thus, in the combustion chamber interior 4, a combustible mixture is generated which is ignited and burned in the combustion chamber 3. The combustion in the combustion chamber interior 4 takes place substantially isobarically. At the combustion chamber outlet 6 of the combustion chamber 3, the mixture is at a high temperature correspondingly effected by the combustion, and said mixture is conducted via a transfer duct 7 to the turbine of the gas turbine 1.

In the FIGURE, a first turbine stage 8 and a second turbine stage 9 of the turbine are illustrated. Each turbine stage 8, 9 has a guide blade row 10 and a rotor blade row 12. The guide blade row 10 of the first turbine stage 8 is formed by a multiplicity of identical guide blades 11 arranged equidistantly over the circumference. The rotor blade row 12 of the first turbine stage 8 is formed by identical rotor blades 13 arranged equidistantly over the circumference. The guide blades 11 and the rotor blades 13 are of axial type of construction. The guide blades 11 are held, at their radially outer ends, by a guide blade carrier 14. The rotor blades 13 are each equipped, at their radially inner ends, with a blade root which engages in a positively locking manner with a rotor 15 of the gas turbine 1. Each guide blade 11 has a blade aerofoil with a trailing edge 16, a leading edge and a suction side (not shown) and a pressure side 18. In the region of the leading edges of the guide blades 11, the hot gas mixture conducted in the transfer duct 7 enters into the first turbine stage 8, wherein the hot gas mixture is diverted by the guide blade row 10, and said hot gas mixture is expanded in the rotor blade row 12 with work being performed.

The higher the turbine inlet temperature of the hot gas mixture, the higher the thermodynamic efficiency of the gas turbine 1. Thermal loading limits of the material of the guide blades 11 yield a maximum admissible turbine inlet temperature. To increase the maximum admissible turbine inlet temperature, the guide blades 11 are cooled during operation of the gas turbine 1 in order to lower the thermal load of the guide blades 11. For this purpose, the guide blades 11 are of hollow design, wherein the guide blades 11 are traversed by a flow of a cooling medium for cooling purposes.

The gas turbine has, as a cooling medium supply device, a bleed line 19, a throttle valve 20, a supply line 21, a cooling air reservoir 22, a cooling air inlet 23, and a chamber 24, wherein the throttle valve 20 is designed as a mass flow control device. The bleed line 19 is connected in fluid-conducting fashion to the compressor plenum 5 and merges via the throttle valve 20 into the supply line 21. The supply line 21 issues into the cooling air reservoir 22, which is arranged radially outside the guide blade row 10 and which is in the form of an annular chamber. Arranged radially directly to the outside of the guide blades 11 and concentrically with respect to the cooling air reservoir 22 is the chamber 24, which issues into the interior spaces of the guide blades 11. The radial distance between the chamber 24 and the cooling air reservoir 22 is bridged, for each guide blade 11, by the cooling air inlet 23.

The compressor exit air flows from the compressor exit via the diverting diffuser into the compressor plenum 5, in which the compressor air is provided as the cooling medium (cooling air). From the compressor plenum 5, the cooling air is bled off by means of the bleed line 19. Depending on the throttling position of the throttle valve 20, a corresponding cooling air mass flow is generated in the bleed line 19 and in the supply line 21. From the supply line 21, the cooling air flows into the cooling air reservoir 22 and is made available in the cooling air reservoir 22. The pressure of the cooling air in the cooling air reservoir 22 is determined in particular by the cooling air mass flow flowing out of the cooling air reservoir 22 through the cooling air inlet 23, the cooling air mass flow flowing into the cooling air reservoir 22 through the supply line 21, and the throttling position of the throttle valve 20. From the cooling air reservoir 22, the cooling air flows via the cooling air inlet 23 into the chamber 24, from where the cooling air flows into the interior spaces of the guide blades 11. The guide blades 11 each have, in the region of their trailing edges 16 and on their pressure sides 18, a substantially radially running row of cooling air outlet openings 25 through which the cooling air flows out of the interior of the guide blades 11 into the main flow.

The cross sections of the bleed line 19, of the supply line 21 and of the cooling air inlet 23 are dimensioned such that, in full-load operation of the gas turbine 1, the guide blades 11 are supplied with a cooling air mass flow of such a magnitude that, when the throttling valve 20 is in a certain throttling position, adequate cooling of the guide blades 11 is provided. Here, the flow-off angle at the guide blades 11 is set such that the rotor blades 13 are impinged on, at their leading edges 17, with an approach flow angle corresponding to the design approach flow angle. In the design of the guide blades 11, it is taken into consideration that the mass flow of the cooling air is large enough that thermal overloading of the guide blades 11 is prevented owing to the cooling action of the cooling air on the guide blades 11, and nevertheless the rotor blades 13 are impinged on by flow in an optimum manner.

As a result of the pressure-side outflow of the cooling air through the cooling air outlet opening 25 in the region of the trailing edges 16 of the guide blades 11, the diversion action of the guide blades 11 is intensified. Thus, in part-load operation of the gas turbine 11, the throttle valve 20, which in full-load operation is in a throttling position, is opened, whereby the mass flow of the cooling air through the cooling air outlet openings 25 is increased. As a result of this, the diversion action of the guide blades 11 is intensified.

Such an increase of the mass flow of the cooling air would not be required with regard to the required cooling action by the cooling air. The increase of the mass flow of the cooling air additionally yields an intensification of the diversion action of the guide blades 11, whereby the diversion angle of the guide blades 11 can be adjusted through corresponding selection of the mass flow of the cooling air by actuation of the throttle valve 20.

In part-load operation of the gas turbine, in which the diversion action of the guide blades 11 is disadvantageously reduced, the throttle valve 20 is opened, in the extreme case fully opened, whereby the mass flow through the cooling air outlet openings 25 is increased. As a result, in part-load operation of the gas turbine 1, the diversion action of the guide blades 11 is advantageously intensified, whereby the leading edges 17 of the rotor blades 13 are impinged on by flow in an optimum manner, and the guide blades 11 are adequately cooled.

A greater amount of compressor air is available in the compressor plenum 5 in part-load operation of the gas turbine 1 than in full-load operation, because, in part-load operation, compressor exit air is conducted so as to bypass the combustion chamber 3 in order that, during the reduction in the turbine inlet temperature, an excessively intense drop in flame temperature is prevented and combustion instabilities are avoided. Said excess compressor exit air is advantageously available for being supplied to the guide blades 11. In extreme part-load operation of the gas turbine 1, the throttle valve 20 is set into a non-throttling position, such that the maximum cooling air mass flow is supplied to the guide blades 11. By contrast, if the gas turbine 1 is operated at full load, the throttle valve 20 is placed into a throttling position, whereby the mass flow of the cooling air is reduced. Said reduction in the mass flow of the cooling air should be selected such that both adequate cooling and also an adequate diversion action of the guide blades 11 are realized at all times during the operation of the gas turbine 1.

The cooling air reservoir 22 acts as a buffer vessel for the cooling air, such that it is possible for a large transient demand for cooling air during the operation of the gas turbine 1 to be compensated by the cooling air reservoir 22. Furthermore, the size of the volume of the cooling air reservoir is selected such that the flow speeds in the cooling air reservoir are low.

The invention claimed is:

1. A method for cooling a turbine stage of a gas turbine, wherein the turbine stage comprises a guide blade that is operable with cooling by a cooling medium, the method comprising:
    operating the gas turbine at part load;
    supplying the cooling medium into an interior of the guide blade by a cooling medium supply device, wherein the guide blade in a region of a trailing edge and on a pressure side comprises at least one cooling medium outlet opening through which the cooling medium can be caused to flow out of the interior of the guide blade into a main flow, and wherein the cooling medium supply device comprises a bleed line, a mass flow control device, a supply line, a cooling air reservoir, a cooling air inlet, and a chamber; and
    controlling the mass flow control device such that a mass flow of the cooling medium flowing via the chamber into the interior of the guide blade is increased at the part load operation in relation to the mass flow of the cooling medium flowing via the chamber into the interior of the guide blade at full-load operation of the gas turbine,
    wherein the mass flow control device comprises a throttle valve,
    wherein the bleed line is connected to a compressor plenum and merges via the throttle valve into the supply line, the supply line issues into the cooling air reservoir, cooling air reservoir is bridged with the chamber via the cooling air inlet,
    wherein the bleed line bleeds compressor air in the compressor plenum as the cooling medium,
    wherein an amount of the cooling medium in the compressor plenum in the part load operation is greater than an amount of the cooling medium in the compressor plenum in the full-load operation,
    wherein the throttle valve is placed into a throttling position at the full-load operation such that the mass flow of the cooling medium flowing via the chamber into the interior of the guide blade is reduced for cooling the guide blade, and
    wherein the throttle valve is opened at the part load operation such that the mass flow of the cooling medium flowing via the chamber into the interior of the guide blade is increased by bleeding the greater amount of the cooling medium in the compressor plenum in the part load operation for cooling the guide blade and adjusting a diversion angle of the guide blade.

2. The method as claimed in claim 1, wherein the guide blade is designed for the mass flow of the cooling medium which is not throttled by the throttle valve in the part load operation.

3. The method as claimed in claim 1, wherein the bleed line bleeds compressor exit air as the cooling medium and the mass flow control device is fed with the compressor exit air from the compressor exit.

4. The method as claimed in claim 3, wherein in the part load operation of the gas turbine, the compressor exit air is conducted so as to bypass a combustion chamber of the gas turbine.

5. The method as claimed in claim 1, wherein the cooling medium is provided to the cooling medium inlet from the cooling medium reservoir by the mass flow control device.

6. The method as claimed in claim 1, wherein the mass flow control device is fed from a compressor plenum of the gas turbine.

7. The method as claimed in claim 1, wherein the guide blade is a first guide blade arranged immediately downstream of a combustion chamber of the gas turbine of a first turbine stage of the gas turbine.

8. The method as claimed in claim 1, wherein the mass flow is set such that the part load operation of the gas turbine is optimized with regard to a thermodynamic efficiency, and/or with regard to a flow impingement angle on a rotor blade arranged downstream of the guide blade, and/or with regard to an exhaust-gas temperature of the turbine of the gas turbine, and/or with regard to a flame stability in the combustion chamber of the gas turbine.

9. A method for operating a gas turbine comprising a turbine stage, wherein the turbine stage comprises a guide blade that is cooled by a cooling medium the method comprising:
    supplying the cooling medium into an interior of the guide blade by a cooling medium supply device, wherein the guide blade, in an outer surface, comprises multiple cooling medium outlet openings through which the cooling medium can be caused to flow out of the interior of the guide blade into a main flow, and wherein the cooling medium supply device comprises a bleed line, a mass flow control device, a supply line, a cooling air reservoir, a cooling air inlet, and a chamber;

controlling a mass flow of the cooling medium flowing via the chamber into the interior of the guide blade by the mass flow control device during operation of the gas turbine; and increasing the mass flow of the cooling medium flowing via the chamber into the interior of the guide blade with a reduction in gas turbine power, wherein the mass flow control device comprises a throttle valve, wherein the bleed line is connected to a compressor plenum and merges via the throttle valve into the supply line, the supply line issues into the cooling air reservoir, cooling air reservoir is bridged with the chamber via the cooling air inlet, wherein the bleed line bleeds compressor air in the compressor plenum as the cooling medium, wherein an amount of the cooling medium in the compressor plenum in a part load operation is greater than an amount of the cooling medium in the compressor plenum in a full-load operation, wherein the throttle valve is placed into a throttling position at the full-load operation such that the mass flow of the cooling medium flowing via the chamber into the interior of the guide blade is reduced for cooling the guide blade, and wherein the throttle valve is opened at the part load operation such that the mass flow of the cooling medium flowing via the chamber into the interior of the guide blade is increased by bleeding the greater amount of the cooling medium in the compressor plenum in the part load operation for cooling the guide blade and adjusting a diversion angle of the guide blade.

10. A gas turbine, comprising:

a turbine stage;

a guide blade;

at least one cooling medium outlet opening arranged in a region of a trailing edge and on a pressure side of the guide blade through which a cooling medium can be caused to flow out of an interior of the guide blade into a main flow; and a cooling medium supply device for supplying the cooling medium via a cooling air inlet into the interior of the guide blade, wherein the cooling medium supply device comprises a bleed line, a mass flow control device, a supply line, a cooling air reservoir, a cooling air inlet, and a chamber, wherein the mass flow control device controls a mass flow of the cooling medium flowing via the chamber into the interior of the guide blade such that the mass flow of the cooling medium flowing via the chamber into the guide blade is increased at part load operation of the gas turbine in relation to the mass flow of the cooling medium flowing via the chamber into the interior of the guide blade at full-load operation of the gas turbine, wherein the mass flow control device comprises a throttle valve, wherein the bleed line is connected to a compressor plenum and merges via the throttle valve into the supply line, the supply line issues into the cooling air reservoir, cooling air reservoir is bridged with the chamber via the cooling air inlet, wherein the bleed line bleeds compressor air in the compressor plenum as the cooling medium, wherein an amount of the cooling medium in the compressor plenum in the part load operation is greater than an amount of the cooling medium in the compressor plenum in the full-load operation, wherein the throttle valve is placed into a throttling position at the full-load operation such that the mass flow of the cooling medium flowing via the chamber into the interior of the guide blade is reduced for cooling the guide blade, and wherein the throttle valve is opened at the part load operation such that the mass flow of the cooling medium flowing via the chamber into the interior of the guide blade is increased by bleeding the greater amount of the cooling medium in the compressor plenum in the part load operation for cooling the guide blade and adjusting a diversion angle of the guide blade.

* * * * *